United States Patent
Asakura et al.

(10) Patent No.: US 8,964,039 B2
(45) Date of Patent: Feb. 24, 2015

(54) IMAGE CAPTURING SYSTEM AND IMAGE CAPTURING METHOD

(75) Inventors: Ayako Asakura, Hino (JP); Hisashi Goto, Suginami-ku (JP)

(73) Assignee: Olympus Corporation, Tokyo (JP)

( * ) Notice: Subject to any disclaimer, the term of this patent is extended or adjusted under 35 U.S.C. 154(b) by 313 days.

(21) Appl. No.: 13/065,856

(22) Filed: Mar. 30, 2011

(65) Prior Publication Data

US 2012/0249805 A1 Oct. 4, 2012

(51) Int. Cl.
*H04N 5/228* (2006.01)
*H04N 5/232* (2006.01)
*H04N 5/77* (2006.01)

(52) U.S. Cl.
CPC ........... *H04N 5/772* (2013.01); *H04N 5/23258* (2013.01); *H04N 5/23267* (2013.01)
USPC ........................................ 348/208.1; 348/345

(58) Field of Classification Search
USPC ..................... 348/208.1–208.11; 396/75, 133
See application file for complete search history.

(56) References Cited

U.S. PATENT DOCUMENTS

| | | | |
|---|---|---|---|
| 7,190,845 B2* | 3/2007 | Iida ............................... | 382/274 |
| 2007/0297780 A1* | 12/2007 | Enomoto ........................ | 396/55 |
| 2010/0103284 A1* | 4/2010 | Sugimori ................... | 348/231.3 |
| 2010/0201828 A1* | 8/2010 | Mitsuya et al. ............ | 348/208.6 |

FOREIGN PATENT DOCUMENTS

| | | |
|---|---|---|
| JP | 2006-050494 | 2/2006 |
| JP | 2006-259688 | 9/2006 |
| JP | 2006-279807 | 10/2006 |
| JP | 2007-043637 | 2/2007 |
| JP | 2008-172321 | 7/2008 |

OTHER PUBLICATIONS

Office Action, dated Mar. 5, 2013, issued in corresponding Japanese Patent Application No. 2009-120708.

\* cited by examiner

*Primary Examiner* — Trung Diep
(74) *Attorney, Agent, or Firm* — Kenyon & Kenyon LLP

(57) ABSTRACT

A front-rear blur amount of a camera, which occurs when a release button is pressed in order to perform image pickup, is detected, and image data obtained by an imaging device on which an image of an object is formed are subjected to image processing on the basis of the front-rear blur amount. As a result, an image on which the effects of front-rear blur are reduced is obtained.

11 Claims, 8 Drawing Sheets

IMAGE CAPTURING SYSTEM AND IMAGE CAPTURING METHOD

FIELD OF THE INVENTION

This invention relates to an image capturing system and an image capturing method.

BACKGROUND OF THE INVENTION

In a conventional camera, a focus lens reaches a focus position when a shutter key is half pressed. JP2006-259688A discloses a camera in which the focus lens is moved at high speed in a case where the shutter key is fully pressed before the focus lens reaches the focus position. Thus, focusing can be performed again before performing image pickup.

SUMMARY OF THE INVENTION

An image capturing system according to an aspect of this invention includes: an imaging device on which an image of an object is formed; a front-rear blur amount detection unit that detects a front-rear blur amount occurring during image pickup; and an image processing unit that performs image processing on image data obtained by the imaging device on the basis of the front-rear blur amount.

An image capturing method according to another aspect of this invention includes: obtaining an object image using an imaging device on which an image of an object is formed; detecting a front-rear blur amount occurring during image pickup; and performing image processing on image data obtained by the imaging device on the basis of the front-rear blur amount.

DESCRIPTION OF THE PREFERRED EMBODIMENTS

Figure 1:
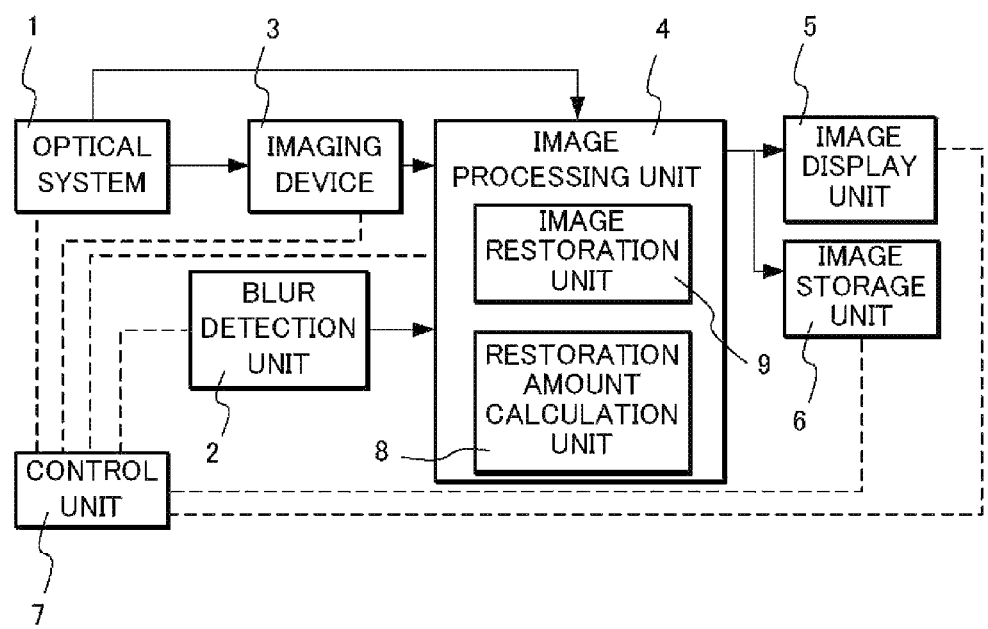
FIG. 1 is a schematic block diagram of an image capturing system according to a first embodiment.

A first embodiment of this invention will be described using FIG. 1. FIG. 1 is a schematic block diagram of an image capturing system according to the first embodiment. Here, a digital still camera (to be referred to as a camera hereafter) will be described as an image capturing device.

The camera includes an optical system 1, a blur detection unit 2, an imaging device 3, an image processing unit 4, an image display unit 5, an image storage unit 6, and a control unit 7.

The optical system 1 is constituted by a plurality of lenses and an aperture, for example. A part of the lenses is moved in an optical axis direction by an actuator or the like. In so doing, focal point adjustment is performed.

The blur detection unit 2 detects a front-rear blur amount of the camera. The front-rear blur amount is an amount (a movement amount from a reference position) of blur in the optical axis direction of the camera during image pickup relative to a reference position of the camera. The blur detection unit 2 is an acceleration sensor, a gyro sensor, or a position sensor, for example. The reference position is a position of the camera following focusing, for example a position of the camera after focusing has been performed by pressing a release button by a predetermined amount.

The imaging device 3 outputs an electric signal corresponding to light incident on a light receiving surface at a predetermined timing. The imaging device 3 is constituted by a CCD (Charge Coupled Device) sensor or a CMOS (Complementary Metal Oxide Semiconductor) sensor, for example, but may be constituted by various other types of imaging devices.

The image processing unit 4 includes a restoration amount calculation unit 8 and an image restoration unit 9.

The restoration amount calculation unit 8 calculates an image restoration amount for the electric signal output by the imaging device 3 on the basis of the front-rear blur amount detected by the blur detection unit 2.

The image restoration unit 9 performs image restoration processing on the electric signal output by the imaging device 3 on the basis of the image restoration amount calculated by the restoration amount calculation unit 8.

The image processing unit 4 also performs processing such as white balance adjustment and gradation/level correction. Image data processed by the image processing unit 4 are output to the image display unit 5 and the image storage unit 6.

The image processing unit 4 is constituted by a CPU, a ROM, a RAM, and so on. The ROM stores a control program and various data. The CPU executes calculations on the basis of the control program stored in the ROM such that the respective functions of the image processing unit 4 are exhibited.

The image display unit 5 is a color liquid crystal display (LCD) panel, an organic EL (OEL) display panel, or the like. The image display unit 5 displays a photographed image on the basis of an image signal output by the image processing unit 4.

The image storage unit 6 stores the image signal output by the image processing unit 4 as image data.

The control unit 7 is connected to the blur detection unit 2, image processing unit 4, image display unit 5, and image storage unit 6, and controls the entire camera, including these units. The control unit 7 is constituted by a CPU, a ROM, a RAM, and so on. The ROM stores a control program and various data. The CPU executes calculations on the basis of the control program stored in the ROM such that the respective functions of the control unit 7 are exhibited.

Figure 2:
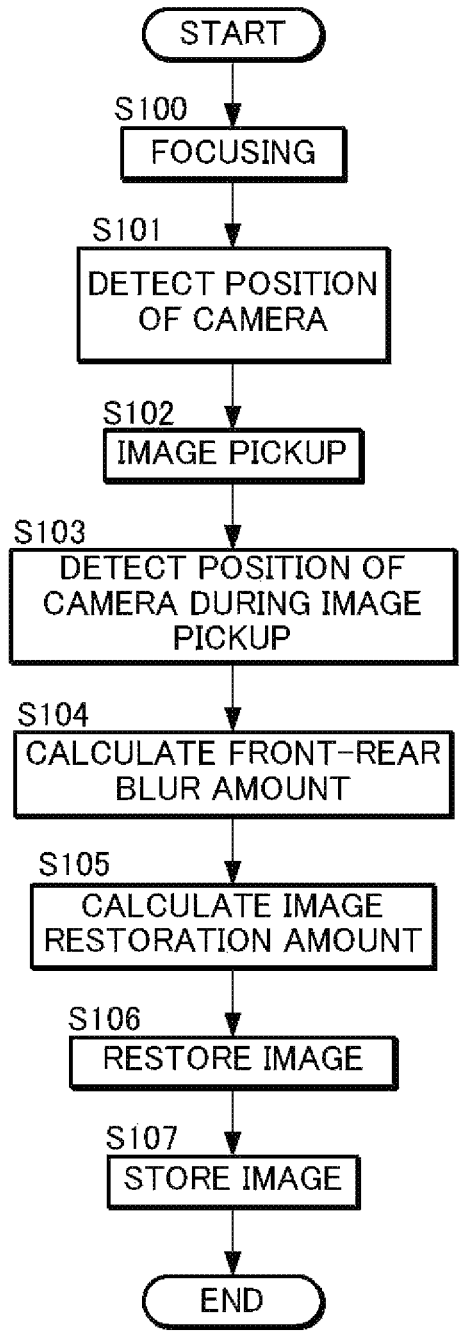
FIG. 2 is a flowchart showing control executed during image pickup according to the first embodiment.

Next, control executed during image pickup according to this embodiment will be described using a flowchart shown in FIG. 2.

When it is determined, in a step S100, that the release button has been pressed by a predetermined amount (set in a half pressed state, for example) by a photographer, focal point adjustment is performed by controlling the optical system 1, and as a result, an object is brought into focus.

In a step S101, the position of the camera following focusing is detected by the blur detection unit 2, and the reference position is determined. Here, the position (attitude) of the camera following focusing is set as the reference position. It should be noted that the step S100 and the step S101 may be performed simultaneously.

When it is determined, in a step S102, that the release button has been pressed further (set in a fully pressed state, for example) by the photographer, image pickup is performed.

In a step S103, the position of the camera during image pickup (at the moment of image pickup) is detected by the blur detection unit 2. The position of the camera may deviate in the optical axis direction between focusing and image pickup, and as a result, a front-rear blur may occur. Therefore, the position of the camera during image pickup is detected in the step S103.

In a step S104, the front-rear blur amount is calculated from the position of the camera following focusing and the position of the camera during image pickup. Note that when the front-rear blur amount is zero, a step S105 is not performed.

Figure 3:
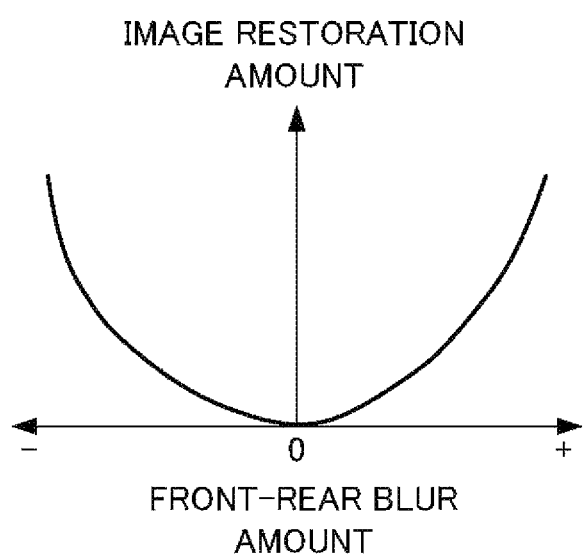
FIG. 3 is a graph showing a relationship between a front-rear blur amount and an image restoration amount.

In the step S105, the image restoration amount is calculated on the basis of the calculated front-rear blur amount. The image restoration amount is calculated using a graph shown in FIG. 3, for example. The image restoration amount increases as the front-rear blur amount from the reference position increases. It should be noted that in FIG. 3, the reference position is set at zero, a direction approaching the object from the reference position is set as "+", and a direction heading away from the object is set as "−".

To calculate the image restoration amount, means other than the graph, for example an equation corresponding to the graph or an approximation thereof, may be used. Alternatively, a lookup table, for example, may be used.

In a step S106, image processing for obtaining a restored image on which the effects of the front-rear blur are reduced is performed on the basis of the calculated image restoration amount using a differential equation shown in Equation (1), for example.

$$f = g + a1 \times g' + a2 \times g'' + \ldots + an \times g'(n) \quad \text{Equation (1)}$$

In Equation (1), f is the restored image, g is the photographed image, and a1 to an are values determined by image forming characteristics of the optical system, the image restoration amount, and so on. The method of subjecting the photographed image to image restoration processing on the basis of the image restoration amount is not limited to the method described above.

In a step S107, the image subjected to image processing on the basis of the image restoration amount is displayed on the image display unit 5, and corresponding image data are stored in the image storage unit 6.

With the control described above, when a front-rear blur occurs during image pickup, an image on which the effects of the front-rear blur are reduced can be obtained quickly.

The front-rear blur amount, the image restoration amount, and so on may be stored in the image processing unit 4, for example. By storing the front-rear blur amount and so on, a time required for image processing can be shortened in a case where the release button is pressed continuously in order to photograph continuous images, and as a result, a number of images that can be photographed per unit time can be increased.

Effects of the first embodiment of this invention will now be described.

By calculating the front-rear blur amount when a front-rear blur occurs during image pickup and performing image processing on the basis of the calculated front-rear blur amount, an image on which the effects of the front-rear blur are reduced can be obtained quickly.

The image restoration processing based on the front-rear blur amount is performed by the image processing unit 4 on the image data obtained when the front-rear blur occurred, and therefore an image on which the effects of the front-rear blur are reduced can be obtained quickly.

By setting the position (attitude) of the camera following focusing as the reference position and calculating the blur of the camera from the reference position at the time of image pickup as the front-rear blur amount, the image photographed at the front-rear blur can be restored to the image following focusing.

By calculating the image restoration amount on the basis of the front-rear blur amount and performing image restoration processing on the basis of the image restoration amount, image restoration processing corresponding to the front-rear blur amount can be performed appropriately.

Next, a second embodiment of this invention will be described.

Figure 4:
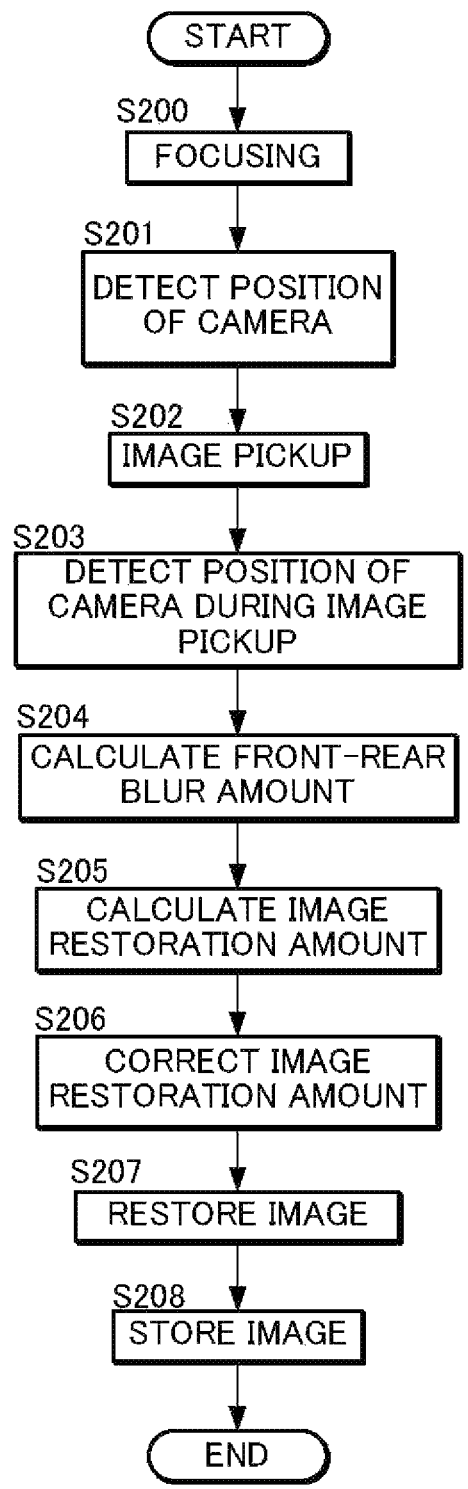
FIG. 4 is a flowchart showing control executed during image pickup according to a second embodiment.

As regards the constitution of the camera, the second embodiment is configured similarly to the first embodiment. The second embodiment differs from the first embodiment in the control executed during image pickup. Here, the control executed during image pickup will be described using a flowchart shown in FIG. 4.

Control executed from a step S200 to a step S205 is identical to the control executed from the step S100 to the step S105 of the first embodiment, and therefore description of this control has been omitted.

In a step S206, the image restoration amount is corrected in accordance with a condition of the optical system 1. The condition of the optical system 1 is information relating, for example, to a focal length. For example, the effects of the front-rear blur amount on the photographed image vary depending on whether the focal length of the optical system 1 is on a wide angle side or a telephoto side. Even when the front-rear blur amount remains constant, for example, the effects of the front-rear blur amount are greater on an image photographed on the wide angle side than an image photographed on the telephoto side. Therefore, the image restoration amount is corrected in accordance with the condition of the optical system 1. By correcting the image restoration amount in accordance with the condition of the optical system 1, an accurate image restoration amount can be calculated.

Further, the image restoration amount is corrected in accordance with a characteristic of the optical system 1. The characteristic of the optical system 1 is information relating, for example, to aberration. An image formed on the light receiving surface of the imaging device 3 via the optical system 1 varies in aberration depending on an image height from an optical axis and so on. Therefore, by correcting the image restoration amount on the basis of an MTF and so on, for example, an accurate image restoration amount can be calculated.

The condition of the optical system 1 and the characteristic of the optical system 1 are stored in advance as a lookup table, for example. If the characteristic of the optical system 1 can be represented by an equation, the equation (including an approximation) may also be stored in advance.

In a step S207, image processing for obtaining a restored image is performed on the basis of the corrected image restoration amount.

In a step S208, the image subjected to the image processing on the basis of the image restoration amount is displayed on the image display unit 5, and corresponding image data are stored in the image storage unit 6.

Effects of the second embodiment of this invention will now be described.

By correcting the image restoration amount on the basis of the condition of the optical system 1 and the characteristic of the optical system 1, an image on which the effects of a front-rear blur are further reduced can be obtained.

By storing the condition of the optical system 1 and the characteristic of the optical system 1 in advance, the time required for the image processing can be shortened.

Next, a third embodiment of this invention will be described.

Figure 5:
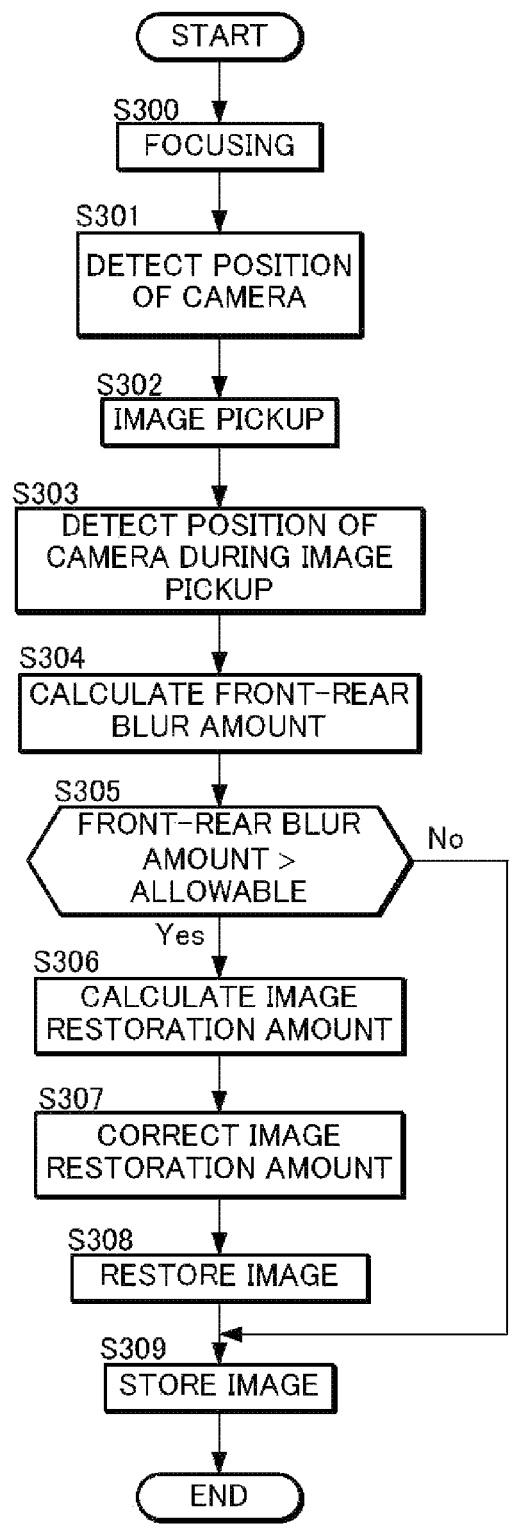
FIG. 5 is a flowchart showing control executed during image pickup according to a third embodiment.

As regards the constitution of the camera, the third embodiment is configured similarly to the first embodiment. The third embodiment differs from the second embodiment in the control executed during image pickup. Here, the control executed during image pickup will be described using a flowchart shown in FIG. 5.

Control executed from a step S300 to a step S304 is identical to the control executed from the step S200 to the step S204 of the second embodiment, and therefore description of this control has been omitted.

In a step S305, the front-rear blur amount is compared to an allowable value. When the front-rear blur amount is equal to or smaller than the allowable value, the image restoration processing is not performed and the routine advances to a step S309. When the front-rear blur amount is larger than the allowable value, the routine advances to a step S306 in order to perform the image restoration processing. The allowable value is a preset value at which a user does not perceive a front-rear blur when the image is printed or the like, for example. The allowable value is set by a manufacturer during design. Alternatively, the photographer may set the allowable value.

Control executed from a step S306 to a step S308 is identical to the control executed from the step S206 to the step S208 of the second embodiment, and therefore description of this control has been omitted.

In a step S309, when the front-rear blur amount is equal to or smaller than the allowable value, the image photographed by the imaging device 3 is displayed on the image display unit 5 as is, and the corresponding image data are stored in the image storage unit 6. When the front-rear blur amount is larger than the allowable value, the image subjected to image restoration in accordance with the front-rear blur amount is displayed on the image display unit 5, and the corresponding image data are stored in the image storage unit 6.

Effects of the third embodiment of this invention will now be described.

By performing the image restoration processing on the basis of the front-rear blur amount when the front-rear blur amount is larger than the allowable value but not performing the image restoration processing when the front-rear blur amount is equal to or smaller than the allowable value, an amount of image processing can be reduced in a case where the front-rear blur amount is substantially non-existent.

Next, a fourth embodiment of this invention will be described.

Figure 6:
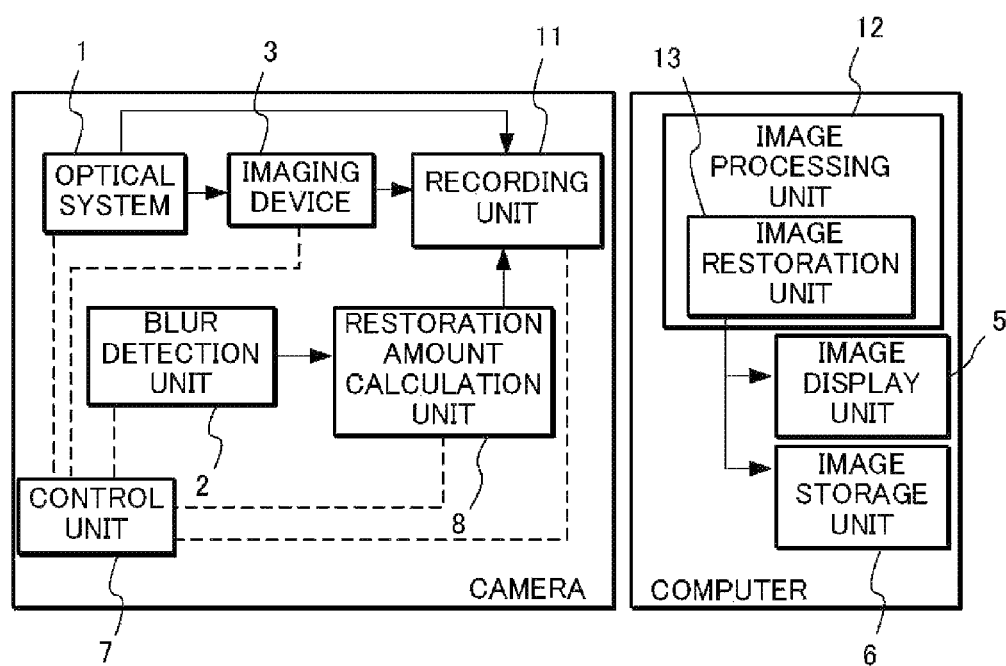
FIG. 6 is a schematic block diagram of an image capturing system according to a fourth embodiment.

An image capturing system according to the fourth embodiment will be described using FIG. 6. FIG. 6 is a schematic block diagram of the image capturing system according to the fourth embodiment. The image capturing system according to the fourth embodiment is constituted by an image capturing device and a processing device. In this embodiment, a case in which a camera is used as the image capturing device and a computer is used as the processing device will be described. However, this invention is not limited thereto.

The camera includes the optical system 1, the imaging device 3, the blur detection unit 2, the restoration amount calculation unit 8, a recording unit 11, and the control unit 7. Identical constitutions to the first embodiment have been allocated identical reference numerals to the first embodiment, and description thereof has been omitted.

The recording unit 11 records the electric signal output by the imaging device 3 as image data. Further, the recording unit 11 records the image restoration amount calculated by the restoration amount calculation unit 8. It should be noted that the image data and the image restoration amount are recorded correlatively. The recording unit 11 also stores the image data and the image restoration amount on a storage medium. The storage medium is a magnetic disk, a magneto-optical disk, a CD-ROM, a DVD-ROM, a semiconductor memory, or the like, for example. The storage medium can be attached to the camera and the computer detachably.

The computer includes an image processing unit 12, the image display unit 5, and the image storage unit 6. The image processing unit 12 includes an image restoration unit 13. The image restoration unit 13 reads the image data and image restoration amount stored on the storage medium and performs image restoration processing on the electric signal output from the imaging device 3.

The computer is constituted by a CPU, a ROM, a RAM, and so on. The ROM stores a control program and various data. The CPU executes calculations on the basis of the control program stored in the ROM such that the respective functions of the processing device are exhibited.

Figure 7:
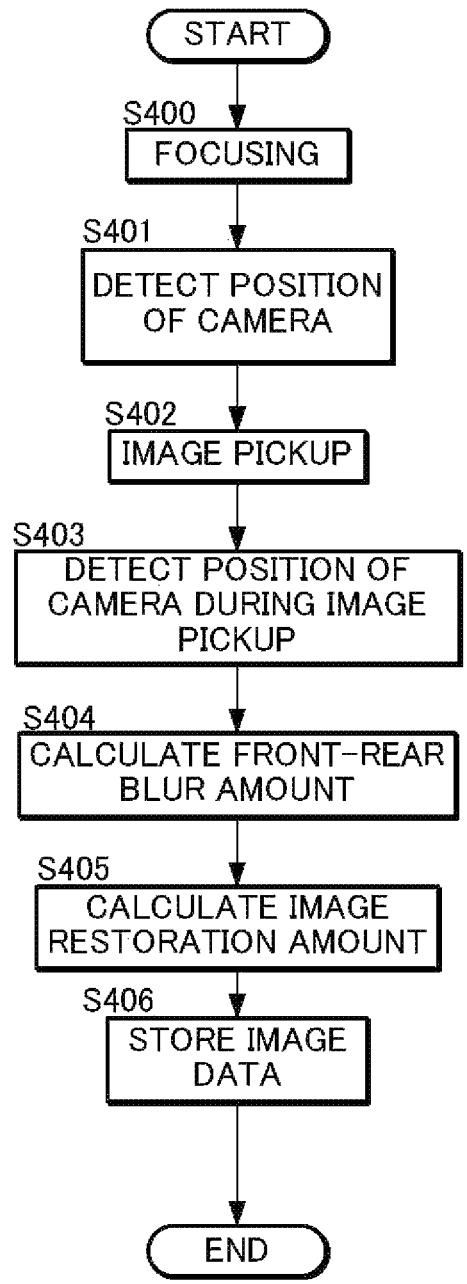
FIG. 7 is a flowchart showing control executed during image pickup according to the fourth embodiment.

Next, control executed during image pickup according to the fourth embodiment will be described using a flowchart shown in FIG. 7.

Control executed from a step S400 to a step S405 is identical to the control executed from the step S100 to the step S105 of the first embodiment, and therefore description of this control has been omitted.

In a step S406, the image data and the image restoration amount are stored on the storage medium.

In this embodiment, the image data and image restoration amount stored on the storage medium are read by the personal computer and subjected to the image restoration processing in order to create an image on which the effects of a front-rear blur are reduced.

Effects of the fourth embodiment will now be described.

The image data and the image restoration amount are stored on the storage medium by the recording unit 11. The image restoration processing is then performed by the computer, and therefore an amount of processing performed in the camera can be reduced.

Figure 8:
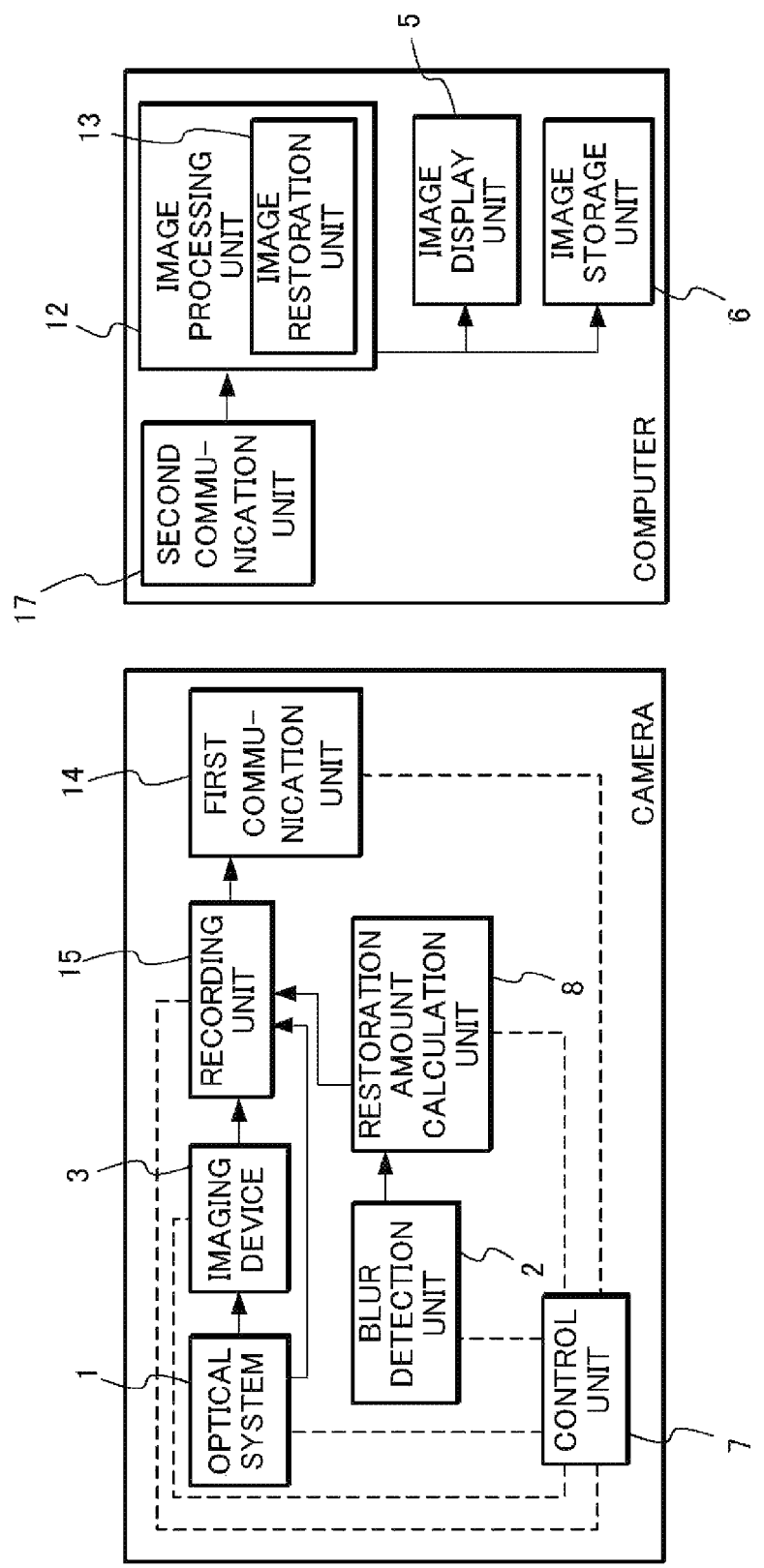
FIG. 8 is a schematic block diagram of an image capturing system according to a fifth embodiment.

Next, an image capturing system according to a fifth embodiment of this invention will be described using FIG. 8. FIG. 8 is a schematic block diagram of the fifth embodiment.

A camera includes, in addition to the constitution of the camera according to the fourth embodiment, a first communication unit 14. All other constitutions are identical to the fourth embodiment, and therefore description of these constitutions has been omitted.

The first communication unit 14 reads the image data and the image restoration amount recorded in a recording unit 15 and transmits a signal corresponding to the image data and the image restoration amount wirelessly to a second communication unit 17 of a computer.

The computer includes the second communication unit 17, the image processing unit 12, the image display unit 5, and the image storage unit 6. The second communication unit 17 receives the signal corresponding to the image data and the image restoration amount transmitted from the first communication unit 14, and transmits the received signal to the image processing unit 12. The image processing unit 12 creates an image on which the effects of a front-rear blur are reduced on the basis of the image data and the image restoration amount.

In the fifth embodiment, the image data and image restoration amount are transmitted from the first communication unit 14 of the camera to the second communication unit 17 of the computer, and the image processing is performed by the computer in a different location to the camera.

It should be noted that in this embodiment, the restoration amount calculation unit 8 is provided in the camera, but the restoration amount calculation unit 8 may be provided in the computer.

Effects of the fifth embodiment will now be described.

By transmitting the image data and the image restoration amount from the first communication unit 14 of the camera to the second communication unit 17 of the computer, a storage capacity of the camera can be reduced. Further, the amount of image processing performed in the camera can be reduced. Moreover, the image processing can be performed as needed by the computer, which is disposed in a separate location to the camera.

The above embodiments are not limited to the constitutions described above and may be realized by combinations of hardware and software. The respective embodiments may also be combined.

The image capturing system may include a CPU, a main storage device such as a RAM, and a non-temporary computer-readable storage medium storing a program for realizing all or a part of the processing described above. Here, this program will be referred to as an image processing program. By having the CPU read the image processing program stored in the storage medium and execute information processing/calculation processing, similar processing to that of the image capturing system described above is realized.

Here, the non-temporary computer-readable recording medium is a magnetic disk, a magneto-optical disk, a CD-ROM, a DVD-ROM, a semiconductor memory, or similar.

This invention is not limited to the embodiments described above, and includes various modifications and amendments within the scope of the technical spirit thereof. For example, the blur detection unit may be provided in a plurality. In this case, an average value, a maximum value, or a minimum value of detection amounts detected by the plurality of blur detection units may be used as a blur amount.

The contents of Japanese Patent Application No 2009-120708, with a filing date of May 19, 2009 in Japan, are incorporated herein in their entirety by reference.

What is claimed is:

1. An image capturing system comprising:
    an imaging device on which an image of an object is formed;
    a front-rear blur amount detection unit that detects a front-rear blur amount occurring during image pickup; and
    an image processing unit that performs image processing on image data obtained by the imaging device on the basis of the front-rear blur amount, wherein the front-rear blur amount corresponds to a positional deviation of a camera in an optical axis direction between focusing and image pickup, wherein the focusing is performed before the image pickup, and
    the image processing unit electronically performs image restoration processing on the image data obtained by the image pickup based on the front-rear blur amount when a front-rear blur occurs due to the positional deviation of the camera in the optical axis direction between the focusing and the image pickup in order to reduce the front-rear blur and restore the image data to image data at the focusing.

2. The image capturing system as defined in claim 1, further comprising an image restoration amount calculation unit that calculates an image restoration amount on the basis of the front-rear blur amount, wherein the image processing unit performs the image processing on the basis of the image restoration amount.

3. The image capturing system as defined in claim 2, comprising:
    an image capturing device having the imaging device, the front-rear blur detection unit, and a recording unit that records the image data obtained from the imaging device and the image restoration amount based on the front-rear blur amount; and
    an image processing device having the image processing unit, which performs image processing on the image data recorded in the recording unit on the basis of the image restoration amount.

4. The image capturing system as defined in claim 3, wherein the image capturing device comprises a transmission unit that transmits the image data and the image restoration amount, and the image processing device comprises a reception unit that receives the image data transmitted from the transmission unit.

5. The image capturing system as defined in claim 2, wherein the image restoration amount calculation unit corrects the image restoration amount in accordance with a condition of an optical system.

6. The image capturing system as defined in claim 2, wherein the image restoration amount calculation unit corrects the image restoration amount in accordance with a characteristic of an optical system.

7. The image capturing system as defined in claim 2, wherein the image restoration amount calculation unit stores at least one of a condition of an optical system and a characteristic of the optical system.

8. The image capturing system as defined in claim 2, wherein the image restoration amount calculation unit stores the front-rear blur amount.

9. The image capturing system as defined in claim 2, wherein the image processing unit performs the image processing on the image data obtained by the imaging device on the basis of the image restoration amount and a value obtained by differentiating the image data.

10. The image capturing system as defined in claim 1, wherein the image processing unit performs the image processing on the basis of the front-rear blur amount when the front-rear blur amount is larger than a predetermined value.

11. An image capturing method comprising:
    obtaining an object image using an imaging device on which an image of an object is formed;
    detecting a front-rear blur amount generated during image pickup; and
    performing image processing on image data obtained by the imaging device on the basis of the front-rear blur amount, wherein the front-rear blur amount corresponds to a positional deviation of a camera in an optical axis direction between focusing and image pickup, wherein the focusing is performed before the image pickup, and
    the image processing is image restoration processing electronically performed on the image data obtained by the image pickup based on the front-rear blur amount when a front-rear blur occurs due to the positional deviation of the camera in the optical axis direction between the focusing and the image pickup in order to reduce the front-rear blur and restore the image data to image data at the focusing.

* * * * *